(No Model.)

J. P. ROE.
WEEDER.

No. 442,918. Patented Dec. 16, 1890.

Witnesses:
Arthur Ashley
G. M. Copenhaver.

Inventor
John P. Roe,
by Ross & Heat
Atty.

UNITED STATES PATENT OFFICE.

JOHN P. ROE, OF OSHKOSH, WISCONSIN.

WEEDER.

SPECIFICATION forming part of Letters Patent No. 442,918, dated December 16, 1890.

Application filed May 2, 1890. Serial No. 350,370. (No model.)

*To all whom it may concern:*

Be it known that I, JOHN P. ROE, a citizen of the United States, residing at the city of Oshkosh, in the county of Winnebago and State of Wisconsin, have invented certain new and useful Improvements in Weeders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a new and useful implement for the purpose of removing weeds from lawns and beds and for transplanting small plants and shrubs.

Figure 1:
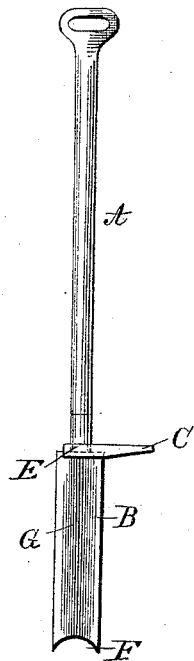
Figure 2:
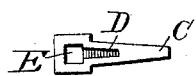

In the accompanying drawings, Figure 1 is a front view of my implement, and Fig. 2 is a bottom view of the foot-rest in Fig. 1.

Similar letters refer to similar parts throughout the several views.

My invention consists of a spade with a relatively narrow blade B, having an upwardly-curved cutting-edge F and a concave face G, the handle A being attached in the usual manner. The projecting foot-rest or pressure-bar C is formed of a separate piece of metal from the blade of the shovel and is adjustable in respect thereto, and can be maintained in a fixed relation to either side of the blade, as may be desired.

In the adjustable foot-rest, Figs. 1 and 2, E is an angular opening corresponding with and fitting around a head E' integral with the blade, and D is a slot or indent corresponding with and admitting the upper end of the blade D', the upper end of the blade of course being straight in cross-section to conform to the shape of the slot and permit the foot-rest to be reversed and secured in position by admitting the upper edge of the blade into the slot, as will be understood from inspection of the drawings. This foot-rest may be raised off from the head E' and changed to the opposite side to accommodate a person using one foot more readily than the other, or for the purpose of resting either foot. It may be cast from malleable iron, and when one becomes broken it can easily be removed and a new one substituted.

It is a well-known fact that the roots of the dandelion and yellow dock run deeply into the ground, and it is necessary to remove the whole of the root to prevent the regrowth of the plant. I provide an implement whereby a person standing erect can with foot-pressure easily remove noxious weeds of this description without materially disfiguring a lawn or bed.

My improvement is also invaluable for transplanting purposes, and can be used in the same manner as described above. The curved cutting-edge F is of advantage in cutting roots, as it prevents the implement from slipping off from the root. The concave face G serves to retain the earth around the root in transplanting; therefore,

What I claim as my invention, and desire to secure by Letters Patent, is—

1. A shovel provided with a narrow blade, and a foot-pressure bar having a socket surrounding the handle and projecting laterally beyond the blade, so as to form a wide pressure-surface for the foot, said bar having a recess on its under side to lock on the edge and corner of the blade.

2. The combination, with a handle, of a narrow spade-like blade having a concave face and an upwardly-curved cutting-edge, and a foot-pressure bar having an angular opening corresponding with and fitting around a head at the upper end of the blade and removable therefrom, substantially as shown.

In testimony whereof I affix my signature in presence of two witnesses.

JOHN P. ROE.

Witnesses:
HARRY R. WILLIAMS,
J. H. MERRILL.